United States Patent
Mankovskii

(10) Patent No.: US 10,061,773 B1
(45) Date of Patent: Aug. 28, 2018

(54) SYSTEM AND METHOD FOR PROCESSING SEMI-STRUCTURED DATA

(71) Applicant: CA, Inc., Islandia, NY (US)

(72) Inventor: Serge Mankovskii, San Ramon, CA (US)

(73) Assignee: CA, Inc., New York, NY (US)

( * ) Notice: Subject to any disclaimer, the term of this patent is extended or adjusted under 35 U.S.C. 154(b) by 516 days.

(21) Appl. No.: 13/964,983

(22) Filed: Aug. 12, 2013

(51) Int. Cl.
*G06F 17/30* (2006.01)

(52) U.S. Cl.
CPC .. *G06F 17/30011* (2013.01); *G06F 17/30908* (2013.01)

(58) Field of Classification Search
CPC ...... G06F 17/20; G06F 17/27; G06F 17/2705; G06F 17/30908; G06F 17/30917; G06F 9/45
See application file for complete search history.

(56) References Cited

U.S. PATENT DOCUMENTS

| | | | | |
|---|---|---|---|---|
| 7,146,381 B1* | 12/2006 | Allen | ............ | G06F 17/2705 707/104.1 |
| 2002/0141449 A1* | 10/2002 | Johnson | ............ | G06F 9/546 370/473 |
| 2003/0014483 A1* | 1/2003 | Stevenson | ............ | H04L 29/06 709/203 |
| 2005/0102322 A1* | 5/2005 | Bagley | ............ | G09B 7/00 |
| 2007/0185837 A1* | 8/2007 | Gurcan | ............ | G06F 17/2247 707/3 |
| 2008/0201697 A1* | 8/2008 | Matsa | ............ | G06F 17/2705 717/143 |
| 2010/0293128 A1* | 11/2010 | Sanders | ............ | H04L 41/0893 706/48 |

* cited by examiner

*Primary Examiner* — James Trujillo
*Assistant Examiner* — Cheryl M Shechtman

(57) ABSTRACT

A computing device is configured to parse a selected semi-structured or unstructured digital document. Once a document is selected, an appropriate parser is selected based on the content type of the document. The document is parsed and the data output to a metadata file. Additionally, any nested documents that are included in the selected document are also parsed using an appropriate parser with the being output to the metadata file. Once complete, the metadata file can be stored and analyzed by a user or administrator using tools that are used to model structured data files.

20 Claims, 4 Drawing Sheets

SYSTEM AND METHOD FOR PROCESSING SEMI-STRUCTURED DATA

BACKGROUND

The present disclosure relates to computer systems, and more particularly to computer devices configured to catalog data for analysis.

Most users store data in one or more relational databases. To access and manage their data, users may employ a standard programming language known as the Structured Query Language (SQL). As is known in the art, SQL is a special purpose programming language and a powerful mechanism for allowing users to structure and catalog relational data. For example, using SQL, users can add, delete, modify, and query existing tables of data, create new schemas for storing data, and control access to the data. Additionally, with the assistance of Entity Relationship (ER) modeling tools, users can conceptually and logically model the relational data stored in the tables. Both SQL and ER modeling tools work very well when operating on tables and data having a well-defined structure.

BRIEF SUMMARY

The present disclosure provides a computer-implemented method and corresponding apparatus for parsing and modeling data within a digital document. More particularly, embodiments of the present disclosure process semi-structured and unstructured documents, and then catalog the results of the processing in an output file. So processed, a user or administrator can analyze and model the data within the output file in a meaningful manner.

In one aspect, the present disclosure provides a method that is implemented on a computing device. In this aspect, the method calls for storing a document in a memory circuit associated with the computing device. The document may comprise a plurality of fields; however, at least one of the fields comprises a nested document (e.g., an image file or video file) stored as a single data entity. The document and the nested document stored within the document are each of their own respective content type. The method calls for parsing the document using a first parser associated with a content type of the document, and then determining whether the first parser is also able to parse the nested document. If the first parser is able to parse the content of the nested document, the method calls for parsing the nested document with the first parser. Otherwise, a different parser may be selected to parse the nested document.

In another aspect, the present disclosure provides a computing device comprising a communications interface, a user input/output interface, and a programmable controller. The controller is configured to retrieve a document from a memory circuit accessible to the computing device. As above, the document comprises a plurality of fields. At least one field comprises a nested document stored as a single data entity, and the document and the nested document are of respective first and second content types. The controller is configured to parse the document using a first parser associated with the first content type, determine whether the first parser is able to parse the nested document, and parse the nested document using one of the first parser, and a second parser associated with the second content type based on whether the first parser is also able to parse the nested document.

In another aspect of the present disclosure, a computer program product comprises a non-transitory computer readable medium configured to store a control application. The control application, when executed on a computing device, configures a programmable controller at the computing device to retrieve a document comprising a plurality of fields from a memory circuit accessible to the computing device. At least one of the fields comprises a nested document stored as a single data entity, and further, the document and the nested document are of respective first and second content types. In this aspect of the present disclosure, the control application is configured to control the processor to parse the document using a first parser associated with the first content type, determine whether the first parser is able to parse the nested document, and parse the nested document using one of the first parser, and a second parser associated with the second content type based on the determining. The output of the parsers is written to an output file and then analyzed to determine whether any relationships exist between data and/or to model the data.

Of course, those skilled in the art will appreciate that the present embodiments are not limited to the above contexts or examples, and will recognize additional features and advantages upon reading the following detailed description and upon viewing the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
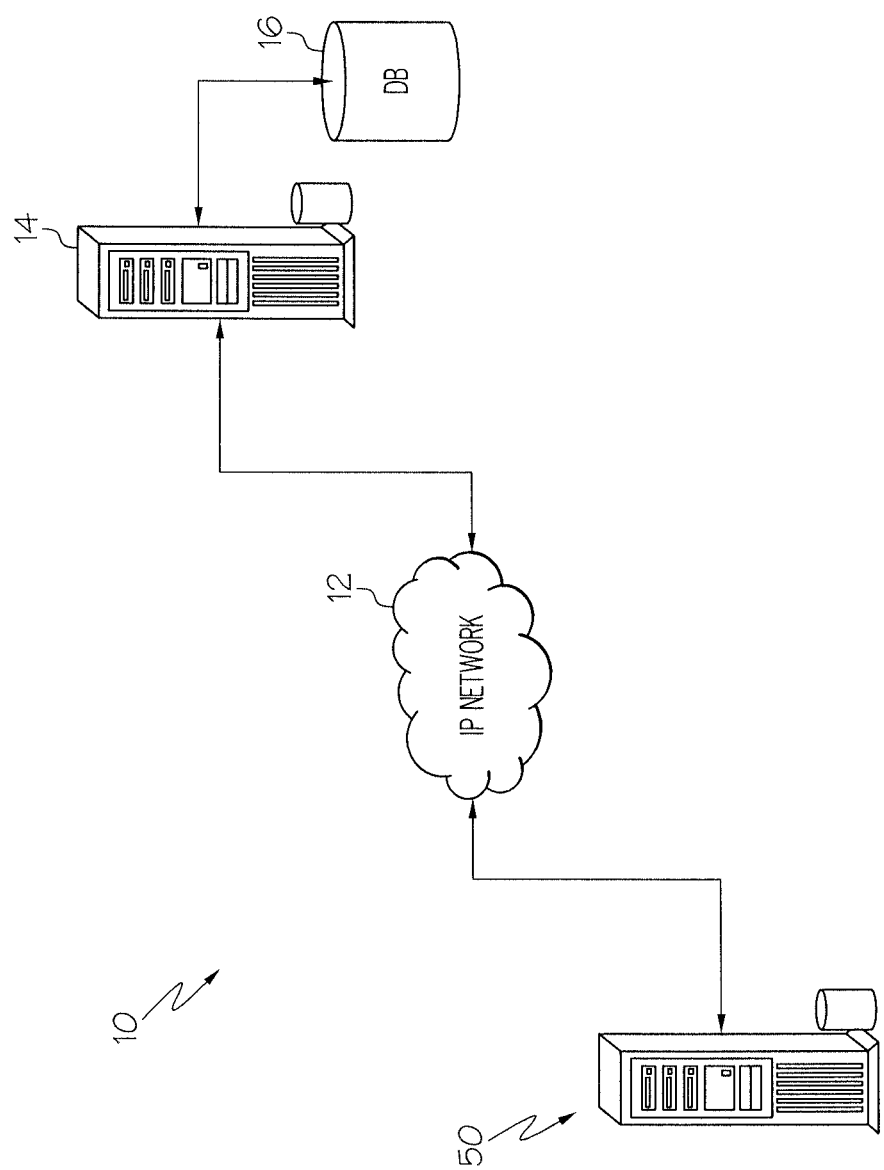
FIG. 1 is a block diagram illustrating a communications system suitable for use in one embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory circuit (RAM), a read-only memory circuit (ROM), an erasable programmable read-only memory circuit (EPROM or Flash memory circuit), an appropriate optical fiber with a repeater, a portable compact disc read-only memory circuit (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Accordingly, the present disclosure provides a system and computer-implemented method for parsing and modeling data in a digital document. More particularly, the disclosure provides a method and apparatus for processing "semi-structured" and "unstructured" documents, and then cataloging the results of the processing. So processed, a user or administrator can analyze the data in a meaningful manner.

In more detail, much of a user's data can generally be stored in databases, which are well-structured. This means that the document comprising the data (e.g., a table or record in the database) conforms to a well-known, predetermined schema or structure (e.g., a table schema), and that the data within the document is of a well-defined type (e.g., integer, float, string, etc.). Additionally, the data in such documents may be subject to predefined constraints (e.g., ranges), and may have well-defined relationships with data in other documents.

"Structured" documents facilitate the ease with which the data in these documents can be cataloged, modeled, and analyzed using, for example, any number of SQL and/or ER tools. However, not all documents are well-structured. Therefore, the data within such documents is not as easy to catalogue, model, and analyze using typical data modeling tools. Some examples of such documents are "semi-structured" and "unstructured" documents.

So-called "semi-structured" documents comprise data that does not conform to a formal structure or schema. However, both the document and the data comprised therein generally have well-known attributes (e.g., document types, data types, etc.) that conform to predefined constraints. Further, the data within semi-structured documents may include tags or other markers that identify and separate different data elements and fields within the document. Some examples of semi-structured documents include, but are not limited to, eXtended Markup Language (XML) documents, Java Script Object Notation (JSON) documents, and email documents.

"Unstructured" documents, on the other hand, comprise data that does not conform to a well-defined formal structure or schema, and in general, lacks the tags or other indicators that separate different parts of the data. Some examples of unstructured data include, but are not limited to, the unstructured data contained in a log file, the text in a body of an email message, and the unstructured data content of a Binary Large Object (BLOB) field of a database record.

Semi-structured and unstructured documents are used in an increasing number of applications. Therefore, the ability to integrate, catalog, model, and define relationships for the data in these documents in a meaningful manner would be beneficial. However, semi-structured and unstructured documents lack the same types of data modeling tools that are currently available for well-structured documents. As such, it is currently difficult and cumbersome to analyze the data in these types of documents, as well as any relationships that may exist between the data in the documents.

Embodiments of the present disclosure therefore provide a method for processing semi-structured and unstructured documents. By way of example only, an email message is a semi-structured document comprised of a well-structured or semi-structured header followed by an unstructured body. The header structure is generally standard so as to facilitate the transmission of the email message throughout a communications network. The body, however, lacks structure so as to allow a user to create a message. Additionally, email messages may contain nested documents, such as attached images or videos, for example, which may themselves comprise structured, semi-structured, and/or unstructured documents.

In another example, a database record, which with its predefined fields and data types, comprises a structured document. However, the same database record may also contain a BLOB field to store a nested image, video, or JSON file, for example, as a single entity. Such BLOB fields, although they are part of a well-known structure, may nonetheless comprise one or more nested documents, which themselves may comprise structured, semi-structured, or unstructured documents.

Therefore, many documents may be considered as having a structured "envelope" (e.g., the header of an email message or a BLOB field in a data record) and semi-structured or unstructured "content" nested within the envelope (e.g., an image file attached to an email or stored within the BLOB field of the data record). It is also possible that a given envelope could contain more than one record of nested content. For example, an e-mail message conforming to the well-known Multipurpose Internet Mail Extensions (MIME) format defines special data structures that explicitly delineate between parts of the e-mail message. Such information may be utilized, along with information related to other parts of the email message, to facilitate the creation of an output file that may be utilized later when analyzing and modeling the data.

Therefore, embodiments of the present disclosure facilitate parsing the semi-structured and/or unstructured documents to extract data and information. By way of example only, the data and information may describe the meaning of the structured, semi-structured, and unstructured parts of the document, as well as the meaning of the nested documents stored as single entities within the document, a declaration of data elements and data types within the nested documents, and attributes of the data within the document, such as data quality and data refinement attributes that identify a Uniform Resource Indicator (URI) or other source that may be used to enrich, update, or otherwise modify the document. Those skilled in the art will appreciate that the data information named herein is exemplary and not limiting. Thus, other information and data is also possible.

Once parsed, embodiments of the present invention may store the data and information in an output file in a metadata repository of a memory circuit. From the output file in the metadata repository, embodiments of the present disclosure can model, mine, browse, and analyze the data.

Turning now to the drawings, FIG. 1 is a block diagram illustrating a communications system 10 suitable for use in one or more embodiments of the present disclosure. As seen in FIG. 1, communications system 10 comprises a computer network 12, such as a private or public IP network, for example, that communicatively interconnects a computing device 50 with one or more computer servers 14. Although not explicitly shown, those skilled in the art will readily appreciate that other devices, such as other computing devices, application servers, databases, and peripheral devices, for example, may be communicatively connected to computing device 50 via network 12.

Generally, computing device 50 is configured to communicate with the server 14 via network 12 using data packets, as is known in the art. According to aspects of the present disclosure, the computing device 50 is configured to request or receive digital documents having a semi-structured and/or unstructured format from server 14. For example, in embodiments where server 14 is an application server, the digital documents may be stored in, and retrieved from, an associated database 16 and sent to the computing device 50 via network 12. In embodiments where server 14 is an email server, the digital documents may comprise emails that are forwarded to the computing device 50 via network 12. In some aspects, the computing device 50 may retrieve these documents from its own local memory circuit.

Regardless of how computing device 50 obtains the semi-structured documents, however, computing device 50 is configured to parse the semi-structured and/or unstructured digital documents in accordance with aspects of the present disclosure to glean information about the data and then store that information in an output file. Thereafter, a user or other operator may access the output file using any desired tool, such as the aforementioned SQL and ER tools, and analyze the data contained therein.

Figure 2:
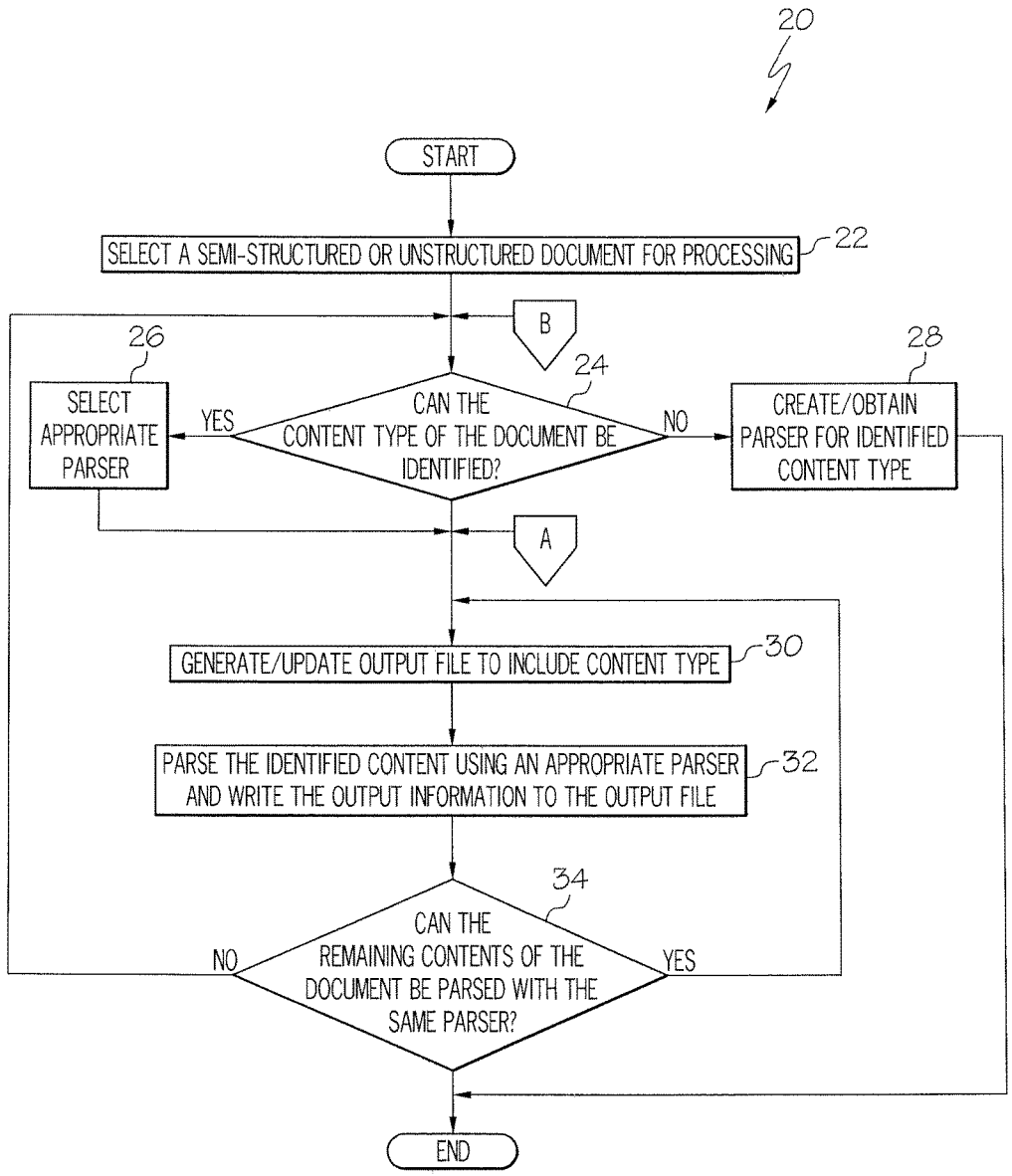
FIG. 2 is a flow diagram illustrating a method of parsing a semi-structured document according to one embodiment of the present disclosure.

FIG. 2 is a flow diagram illustrating a method 20 in which the computing device 50 processes a semi-structured digital document in accordance with one aspect of the present disclosure. For illustrative purposes only, method 20 is described as if the computing device 50 were processing an e-mail message formatted according to the well-known MIME format. As is known in the art, documents in the MIME format generally have a structured header and an unstructured body to include a user's text.

Method 20 begins with the selection, by a user, for example, of an email message for processing (box 22). A programmable controller (seen later in FIG. 4) in the computing device 50 first determines a content type for the email message (box 24), and then continues processing based on that determination. For example, the controller in the computing device may analyze the content of the document to look for certain fields or keywords that contain data identifying the document type. In the case of an email message, for example, the controller may determine whether a "content-type" field exists in the header. If so, the controller could extract the information from that field (e.g., "MIME") and search a database of pre-defined content types stored in memory to identify a parser that is capable of parsing documents of that type.

An example of the type of information that could be stored in such a database appears in Table 1. Those skilled in the art will appreciate that the information in Table 1 is merely illustrative, and that the database may comprise any information needed or desired arranged in any manner needed or desired.

TABLE 1

| CONTENT TYPE | PARSER ID | PARSER LOCATION |
| --- | --- | --- |
| MIME-Version 1.0 | PARSER 1 | C:\ . . . \Parsers\MIME-Parser-1.0 |
| JPEG | PARSER 2 | C:\ . . . \Parsers\JPEG Parser-1 |

TABLE 1-continued

| CONTENT TYPE | PARSER ID | PARSER LOCATION |
|---|---|---|
| MPEG3 | PARSER 3 | C:\ . . . \Parsers\MPEG-Parser-3.0 |
| MPEG4 | PARSER 4 | http\\www.server-1\parser\. . . \.com |
| . . . | . . . | . . . |

In this embodiment, each pre-defined content type identified in the database is associated with a corresponding parser that is configured to parse documents of that type. The parser may be identified, for example, by a parser ID and located at a specific memory address on computing device 50, or at a memory location on another device (e.g., server 14 and/or database 16) that is accessible to computing device 50 via network 50. Thus, if the identified content type exists in the database (box 24), the controller at computing device 50 can determine the identity of the parser that is associated with that particular content type. The computing device 50 could also identify the address of the associated parser, and select that parser to parse the contents of the selected document (box 26). However, if the content type is not in the database, the controller at computing device 50 may be configured to search for an appropriate parser via network 12. Alternatively, or in addition, computing device 50 could inform the user that a parser could not be found for the content type and that a parser must therefore be created (box 28). In these latter cases, processing according to the method 20 could end, or be suspended, until an appropriate parser is created or found, and loaded into the database and associated with its corresponding content type.

Those of ordinary skill in the art will realize that other methods for determining the content type for the document are possible. For example, a user could know or obtain the content type from documentation associated with the document, or visually determine the content type and provide the content type to the computing device 50 using a User Input/Output (I/O) interface.

Alternatively, the controller may be configured to search the Internet or other network to locate a server that has information on the content type. In some aspects, computing device 50 may utilize a software program to examine the structure of the selected document and determine its content type based on that examination. In such embodiments, the computing device 50 may be configured to store a plurality of pre-defined constraints for each document type in the database. By way of example, a constraint may define the type of output required by the parser when parsing the document, such as the output must be ASCII text understandable by a human user, or the output must be in the English language and at least 20 characters in length, or the output must be a valid JPEG image. If a parser is not capable of providing such output when parsing the document, then the computing device 50 may deem that particular parser as being unable to parse the content of the document, and thus, will not select that parser. In one embodiment, a parser provides (e.g., displays) its output to a user to allow the user to determine whether the parser is capable of parsing the document type.

Once the content type has been identified, and a corresponding parser selected, the controller in computing device 50 generates an output file to store the information extracted by the selected parser. Particularly, in one embodiment, the selected parser extracts and writes the detected content type associated with the document in the output file (box 30), and then parses the remaining portions of the selected document. The output of the selected parser comprises, in part, the data parsed from the selected document and is written to the output file (box 32). If an output file already exists, as described in more detail later, the output file is simply updated with the determined content type information.

The selected parser will generally output a variety of information depending on the content type of the document. However, the information that a given parser could output to the output file includes, but is not limited to, the document type, the data types for any fields in the document (e.g., integer, string, double, BLOB, etc.), a meaning or significance of the fields or data (which may be obtained, for example, from commentary contained within the document), and an indication of whether the data within the document can or cannot be read using the human eye (e.g., is the file an ASCII file or a binary file). In addition, information defining ways in which the data or the document may be used by an end user or other operator can also be determined and written to the output file. Thereafter, as previously stated, the information written to the output file may be utilized by a user or other operator to, inter alia, model relationships with data from other files using SQL or ER tools, for example.

As previously stated, some documents, such as email messages, for example, may include one or more nested documents such as image files, video files, and text or binary documents, stored in the document as single entities. Therefore, once the selected parser is finished parsing the document, the controller at computing device 50 will determine whether that same parser could be utilized to parse these nested documents (box 34). If so, method 20 updates the output file to include the content type of the nested document (box 30), parses the nested document and updates the output file with the output information (box 32), and determines whether the nested document itself comprises any other nested documents or parts that require parsing (box 34). The process then continues for each identified nested part of the document until all parts of the document have been processed. An example of an output file generated according to method 20 appears below in Table 2.

TABLE 2

| DOCUMENT/ DOCUMENT PART | CONTENT TYPE | EXPECTED CONTENT | DESCRIPTION | ADDITIONAL INFORMATION |
|---|---|---|---|---|
| Email Message HEADER | MIME | Text, Image Attachment | MICROSOFT OUTLOOK | |
| Source Address | String | IP Address | | |
| Destination Address | String | IP Address | | |
| . . . | . . . | . . . | . . . | . . . |

TABLE 2-continued

| DOCUMENT/DOCUMENT PART | CONTENT TYPE | EXPECTED CONTENT | DESCRIPTION | ADDITIONAL INFORMATION |
|---|---|---|---|---|
| BODY | | | | |
| Text Message | ASCII | Alpha-Numeric Text | Body of Message | |
| ATTACH-1 Image Content Image Content | JPEG | Color Image Human Faces Animal | JPEG Image Faces of Family Members Family Dog | Family Picture Identified using Face Recognition Software Identified by User |
| . . . | . . . | . . . | . . . | . . . |
| Image Information | Image/META/EXIF | | Information identifying aspects related to the image | . . . |
| Camera Manufacturer | String | Camera Manufacturer | | |
| Camera Model | String | Camera Model | | |
| Software Version | String | Firmware Version of the Camera | | |
| Image Orientation | Integer | | TOP-LEFT | See http://www.impulseadventure.com/photo/exif-orientation.html for valid Values |
| Date and Time | MIME/DATE-TIME | Date-Time | Date and Time Image was captured | |
| Year | Integer | Year | | |
| Month | Integer | Month | | |
| Day | Integer | Day | | |
| . . . | . . . | . . . | . . . | . . . |
| ATTACH-2 | JPEG | Color Image | JPEG Image | Family Picture |
| . . . | . . . | . . . | . . . | . . . |
| ATTACH-3 | MOV | Video | Video | Home Video |
| . . . | . . . | . . . | . . . | . . . |
| ATTACH-4 | DOCX | Document | MICROSOFT WORD DOCUMENT | Work Document |
| . . . | . . . | . . . | . . . | . . . |

As stated above, this output file may be saved with other similar output files and utilized in an analysis of the data. For example, the data in the output files may be modeled using any of a variety of well-known tools to analyze the data. From this analysis, users can determine and/or create relationships, for example, for such data.

Figure 3:
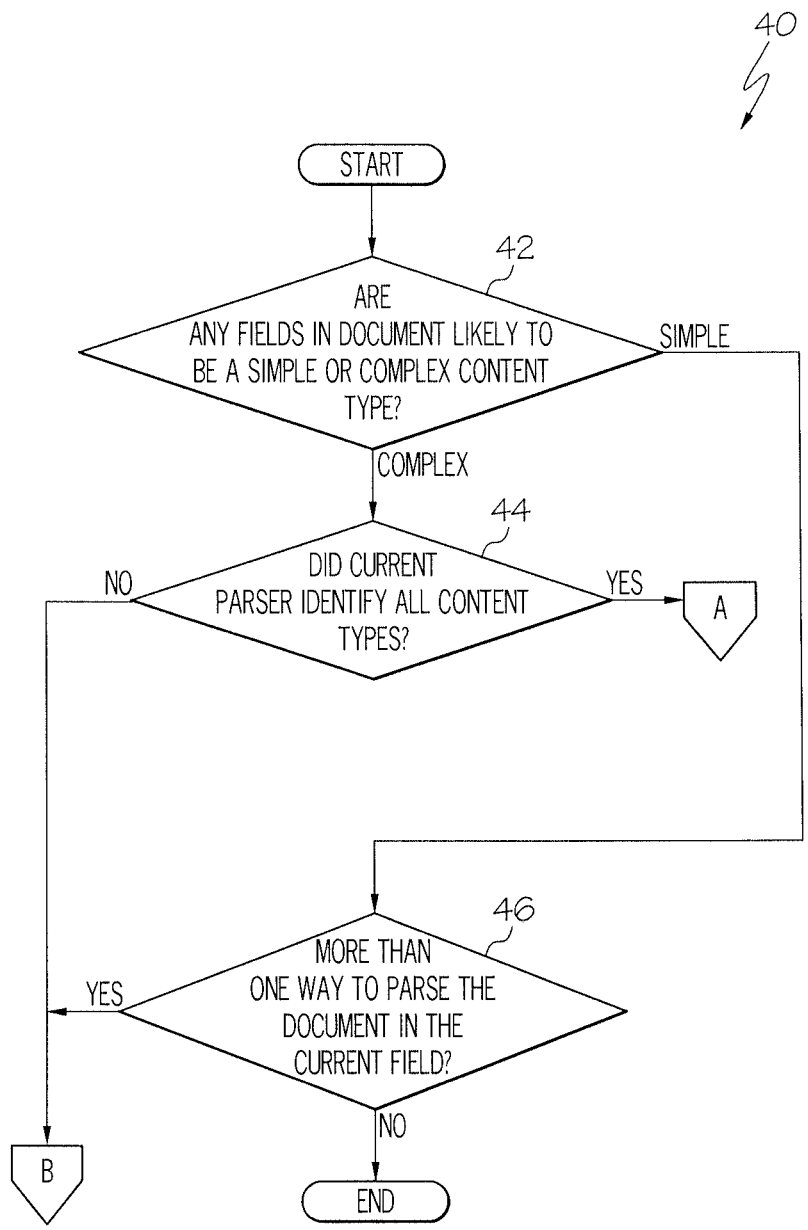
FIG. 3 is a flow diagram illustrating a method of parsing a semi-structured document according to another embodiment of the present disclosure.

FIG. 3 is another flow diagram illustrating a method 40 by which computing device 50 may determine whether a currently selected parser is able to parse the document fields or other documents nested within the document being processed. As seen in FIG. 3, method 40 begins with the controller in computing device 50 determining whether any of the other fields in the document, or whether any of the data contained in those fields (i.e., the nested documents), are likely to be a simple content type (e.g., integer, double, string, etc.) or a complex type (e.g., JPEG, MOV, etc.) (box 42). Such determinations may be made, for example, by the controller in computing device 50 inspecting the content type of the nested documents, and/or the content of the nested document. In one aspect, the controller in computing device 50 can determine the content of the nested document simply from determining the content type of the nested document.

If any of the data contained in the fields are likely to be of a complex type (e.g., the nested documents), the controller determines whether the currently selected parser can identify or recognize all of the content types in the nested documents (box 44). If so, processing returns to updating the output file with the content type of the nested document (box 30 in FIG. 2) and parsing the nested document using the currently selected parser (box 32 in FIG. 2). If not, processing returns to determine the parser that is required to parse the particular field or nested document (box 24 in FIG. 2).

If any of the data contained in the fields are not likely to be of a complex type (box 42) or if there is more than one method to parse the nested document (box 46), processing returns to determining whether the content type for the nested documents can be identified (box 24 in FIG. 2). Otherwise, processing ends.

Figure 4:
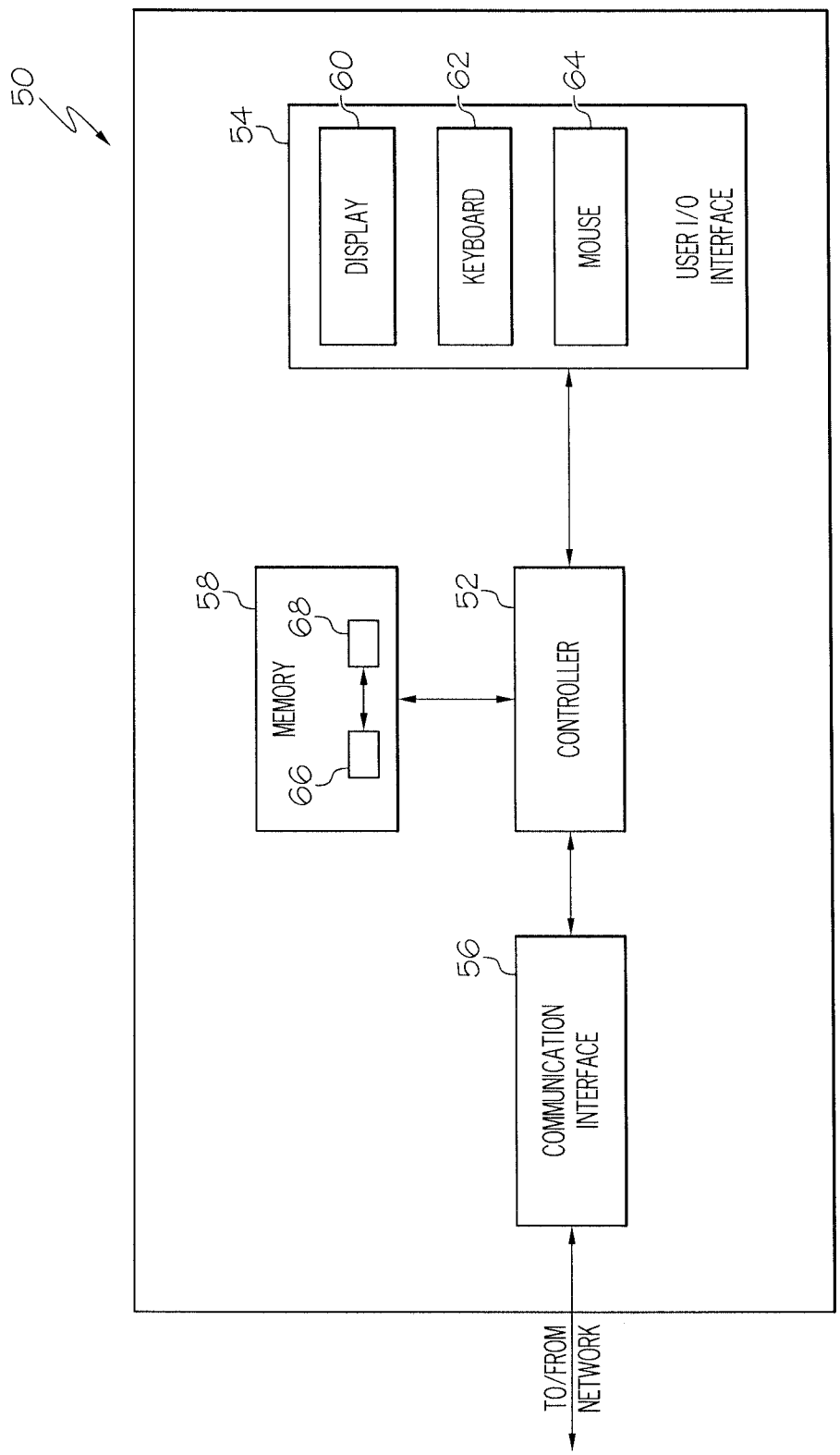
FIG. 4 is a block diagram illustrating a computing device configured to parse semi-structured according to the present disclosure.

FIG. 4 is a block diagram illustrating some component parts of a computing device 50 configured to process documents in accordance with one or more aspects of the present disclosure. As seen in FIG. 4, the computing device 50 comprises a programmable controller 52, a user input/output (I/O) interface 54, a communications interface 56, and a memory 58. The programmable controller 52 may be implemented by one or more microprocessors, hardware, firmware, or a combination thereof, and generally controls the operation and functions of computing device 50 according to the appropriate standards. Such operations and functions include, but are not limited to, communicating with server 14 via communications interface 56 and network 12 and processing selected semi-structured and unstructured documents in accordance with the embodiments previously described.

The user I/O interface 54 facilitates user interaction with the computing device 50, and thus, comprises a display 50 to display output to a user, and a keyboard 62 and mouse 64 to receive user input. Particularly, using the keyboard 62 and/or mouse 64, the user may select documents for processing in accordance with the present disclosure and view the output of the processing on display 60.

The communications interface 56 comprises a transceiver or other communications interface known in the art that facilitates the communications with one or more remote parties over communications network 12. Such an interface may comprise, for example, an ETHERNET component capable of communicating data and information over a communications network as is known in the art. In one aspect, the controller 52, in accordance with the instructions in the control application 66, generates and sends messages to server 14 to retrieve a selected semi-structured or unstructured document for processing, and/or to retrieve other information, such as content types for the selected documents, as previously described.

The memory 58 may comprise any non-transitory, solid state memory or computer readable media known in the art. Suitable examples of such media include, but are not limited to, Read Only Memory (ROM), Dynamic Random Access Memory (DRAM), Flash, or a device capable of reading computer-readable media, such as optical or magnetic media. The memory 58 stores programs and instructions, such as control application 66, and output files 68. Further, as previously described, the memory circuit 58 may store information utilized by the control application 66, such as content type information, when processing the selected semi-structured and unstructured documents. The control application 66, when executed by controller 52, causes the controller 52 to select and retrieve a semi-structured document, and parse the document, as well as any nested documents associated with the selected document, as previously described.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, to blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A computer-implemented method comprising:
   storing a structured document in a memory circuit associated with a computing device, the structured document comprising a database record of a database table and also comprising a plurality of fields in which a first field comprises a nested document stored as a single data entity within the first field, and wherein:
      the structured document and the nested document are of respective first and second content types; and
      the nested document is of a second document type comprising one of a semi-structured document, and an unstructured document;
   parsing the structured document using a first parser associated with the first content type, wherein parsing the structured document comprises the first parser extracting information describing characteristics of the structured document;
   determining whether the first parser is able to parse the nested document;
   parsing the nested document using one of the first parser, and a second parser associated with the second content type based on the determining, wherein parsing the nested document comprises the one of the first and second parsers extracting information describing characteristics of the nested document; and
   generating an output file comprising the information describing the characteristics of the structured document, and the information describing characteristics of the nested document, wherein generating an output file comprises:
      writing output from the first parser to the output the stored in the memory circuit of the computing device; and
      updating the output the by writing output from the second parser to the output file.

2. The computer-implemented method of claim 1 wherein determining whether the first parser is able to parse the nested document comprises determining whether the first field comprising the nested document is of a data type that is associated with the first content type and different than the second content type.

3. The computer-implemented method of claim 2 wherein if the data type of the first field comprising the nested document is associated with the first content type and is different than the second content type, the computer-implemented method further comprises determining whether the first parser is able to identify a field and a corresponding data type in the nested document for the first field.

4. The computer-implemented method of claim 3 further comprising:
if the first parser is able to identify the field and corresponding data type in the nested document, parsing the nested document using the first parser; and
if the first parser is unable to identify the field and corresponding data type in the nested document, parsing the nested document using the second parser.

5. The computer-implemented method of claim 2 further comprising:
selecting the second parser based on the second content type of the nested document if the data type of the first field comprising the nested document is not associated with the first content type; and
parsing the nested document using the second parser.

6. The computer-implemented method of claim 2 wherein if the data type of the first field comprising the nested document is not associated with the first content type, the computer-implemented method further comprises:
determining, based on data types of fields that are in the nested document, whether there are other methods of parsing the nested document;
selecting a parser for each identified method of parsing the nested document; and
parsing the nested document using each of the selected parsers.

7. The computer-implemented method of claim 1 wherein determining whether the first parser is able to parse the nested document comprises determining whether the first parser is configured to output parsed data of a selected output type.

8. The computer-implemented method of claim 1 further comprising determining whether any of the plurality of fields comprises a complex content type, wherein each field that comprises a complex content type also comprises a nested document stored as a single data entity within the field.

9. A computing device, comprising:
a communications interface configured to communicate data with a server via a communications network; a user input/output (I/O) interface; and
a processing circuit communicatively connected to the communications interface and the user I/O interface and configured to:
retrieve a structured document from a memory circuit accessible to the computing device, the structured document comprising a database record of a database table and also comprising a plurality of fields in which a first field comprises a nested document stored as a single data entity within the first field, and wherein:
the structured document and the nested document are of respective first and second content types; and
the nested document is of a second document type comprising one of a semi-structured document, and an unstructured document;
parse the structured document using a first parser associated with the first content type, wherein the first parser extracts information from the structured document describing characteristics of the structured document;
determine whether the first parser is able to parse the nested document;
parse the nested document using one of the first parser and a second parser associated with the second content type based on the determining, wherein the one of the first and second parsers extracts information from the nested document describing characteristics of the nested document; and
generate an output file comprising the information describing the characteristics of the structured document and the information describing characteristics of the nested document, wherein to generate the output file, the processing circuit is further configured to:
write output from the first parser to the output file stored in the memory circuit of the computing device; and
update the output the by writing output from the second parser to the output file.

10. The computing device of claim 9 wherein the processing circuit is further configured to determine whether the first field comprising the nested document is of a data type that is associated with the first content type and different than the second content type.

11. The computing device of claim 10 wherein if the data type of the first field comprising the nested document is associated with the first content type and is different than the second content type, the processing circuit is further configured to determine whether the first parser is able to identify a field and a corresponding data type for the field in the nested document.

12. The computing device of claim 11 wherein the processing circuit is further configured to:
parse the nested document using the first parser if the first parser is able to identify the field and corresponding data type in the nested document; and
parse the nested document using the second parser if the first parser is unable to identify the field and corresponding data type in the nested document.

13. The computing device of claim 10 wherein the processing circuit is further configured to:
select the second parser based on the second content type of the nested document if the data type of the first field comprising the nested document is not associated with the first content type; and
parse the nested document using the second parser.

14. The computing device of claim 10 wherein if the data type of the first field comprising the nested document is not associated with the first content type, the processing circuit is further configured to:
determine, based on data types of fields that are in the nested document, whether there are other methods of parsing the nested document;
select a parser for each identified method of parsing the nested document; and
parse the nested document using each of the selected parsers.

15. A computer program product, comprising:
a non-transitory computer readable medium configured to store a control application that, when executed on a computing device, configures a programmable processing circuit to:
    retrieve a structured document from a memory circuit accessible to the computing device, the structured document comprising a database record of a database table and also comprising a plurality of fields in which a first field comprises a nested document stored as a single data entity within the first field, and wherein:
        the structured document and the nested document are of respective first and second content types; and
        the nested document is of a second document type comprising one of a semi-structured document and an unstructured document;
    parse the structured document using a first parser associated with the first content type, wherein the first parser extracts information from the structured document describing characteristics of the structured document;
    determine whether the first parser is able to parse the nested document;
    parse the nested document using one of the first parser and a second parser associated with the second content type based on the determining, wherein the one of the first and second parsers extracts information from the nested document describing characteristics of the nested document; and
    generate an output file comprising the information describing the characteristics of the structured document and the information describing characteristics of the nested document, wherein to generate the output file, the control application further configures the processing circuit to:
        write output from the first parser to the output file stored in the memory circuit of the computing device; and
        update the output the with output from the second parser.

16. The computer program product of claim 15 wherein the control application further configures the processing circuit to determine whether the first field comprising the nested document is of a data type that is associated with the first content type and different than the second content type.

17. The computer program product of claim 16 wherein if the data type of the first field comprising the nested document is associated with the first content type and is different than the second content type, the control application further configures the processing circuit to determine whether the first parser is able to identify a field and a corresponding data type for the field in the nested document.

18. The computer program product of claim 17 wherein the control application further configures the processing circuit to:
    parse the nested document using the first parser if the first parser is able to identify the field and corresponding data type in the nested document; and
    parse the nested document using the second parser if the first parser is unable to identify the field and corresponding data type in the nested document.

19. The computer program product of claim 16 wherein the control application further configures the processing circuit to:
    select the second parser based on the second content type of the nested document if the data type of the first field comprising the nested document is not associated with the first content type; and
    parse the nested document using the second parser.

20. The computer program product of claim 16 wherein if the data type of the field comprising the nested document is not associated with the first content type, the control application further configures the processing circuit to:
    determine, based on data types of fields that are in the nested document, whether there are other methods of parsing the nested document;
    select a parser for each identified method of parsing the nested document; and
    parse the nested document using each of the selected parsers.

* * * * *